United States Patent Office

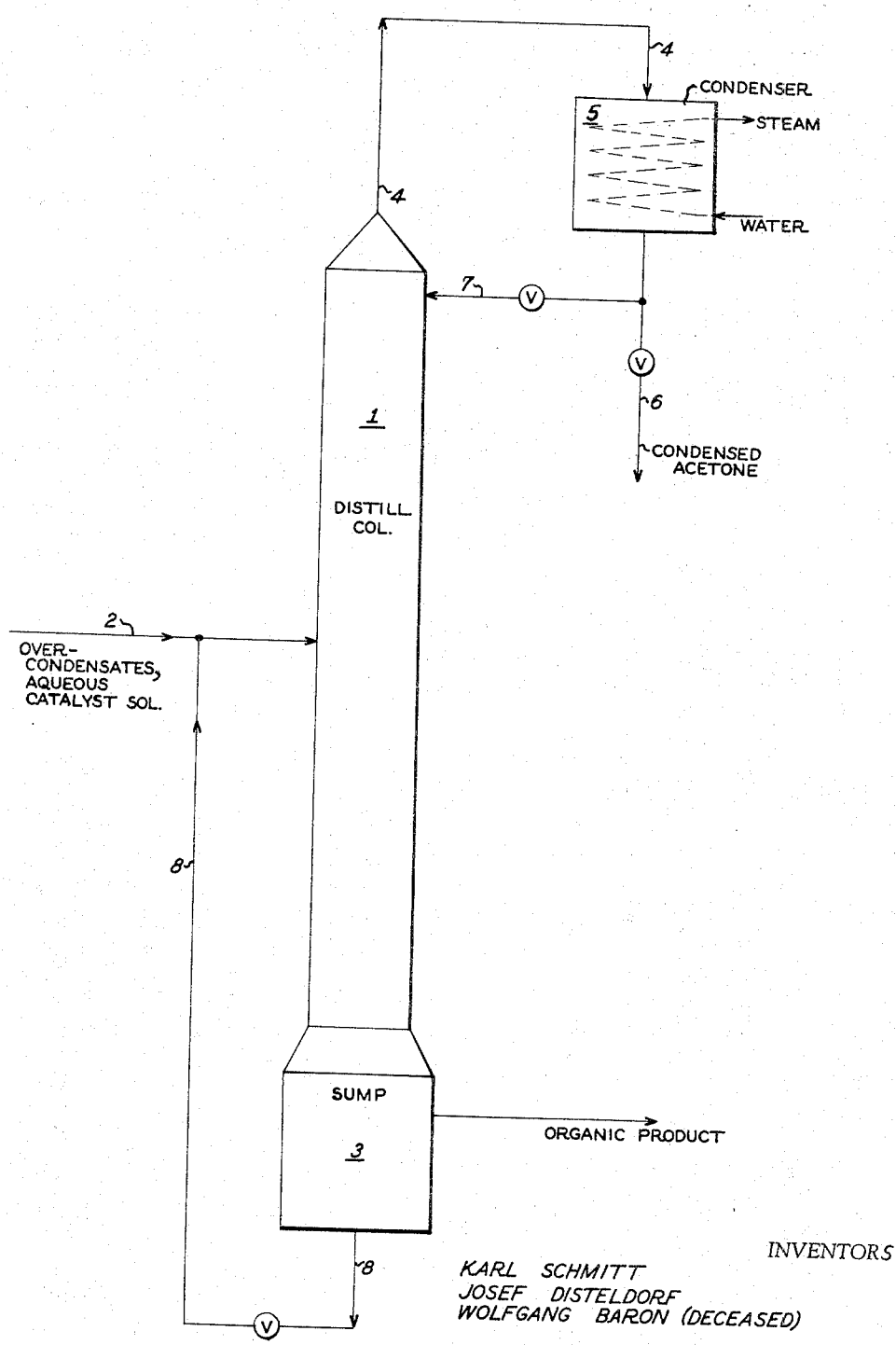

3,337,423
Patented Aug. 22, 1967

3,337,423
PROCESS FOR RECOVERING ISOPHORONE
Karl Schmitt, Herne, Westphalia, and Josef Disteldorf, Wanne-Eickel, Germany, and Wolfgang Baron, deceased, late of Bochum, Germany, by Gunhild Baron, nee Mayer, legal representative, Marburg (Lahn), Germany, assignors to Hibernia-Chemie G.m.b.H., Gelsenkirchen-Buer, Germany, a corporation of Germany
Filed Dec. 18, 1961, Ser. No. 160,363
Claims priority, application Germany, Dec. 23, 1960, B 60,625
12 Claims. (Cl. 203—37)

The present invention relates to a process for recovering isophorone, and more particularly to such a process for recovering isophorone in high yields from the organic reaction mixture obtained from the condensation of acetone to isophorone.

It is known that a series of side reactions occur during the condensation of acetone to isophorone, which side reactions considerably adversely affect the quantity and quality of the over-all condensation. As a result of these side reactions, mesityl oxide and overcondensates occur in considerable quantities in the acetone-condensation product reaction mixture. Therefore, attempts have been made to recover these by-products for use in some form, so that the over-all condensation will be rendered more economical. In addition to the foregoing by-products, compounds such as, for example, phorone, beta-isophorone and xylitones, are also formed during the acetone condensation. While the latter compounds are concededly less important with respect to their quantity in the reaction mixture, their presence is detrimental to the customary subsequent work-up of the reaction mixture to recover isophorone. In this connection, during the usual distillation which follows the condensation, phorone, beta-isophorone, and xylitones can only be separated from the desired isophorone to a partial extent, and then only under uneconomical conditions. The foregoing by-products, and especially phorone, beta-isophorone, and xylitones, produce changes in the make up of the isophorone product obtained, particularly as a result of decompositions in the technical isophorone product during the course of time. Such decompositions produce discolorations, acid formation by way of oxidative decomposition, etc., whereby the quality of the isophorone product is considerably decreased. Accordingly, any practical answer to the question of how to remove the objectionable by-products which occur in significant amounts from the acetone-condensation products, in order to obtain isophorone of higher purity and again utilizable materials would find wide commercial acceptance.

One conventional method for working up the condensation products of acetone employs a liquid phase treatment of the condensation products with an aqueous alkali solution of 0.5 to 25% concentration at a temperature between 130 and 235 degrees C. In this manner, however, comparatively insufficient yields of reusable substances are obtained. This is due to the fact that the acetone formed from the hydrolytic cleavage of the by-products recondenses at least in part to xylitones in the reaction mixture including isophorone, whereby such xylitones, in turn, once more manifest the usual difficulties in the work up to pure isophorone, and lead to later objectionable decompositions in the technical isophorone product upon standing. The liquid phase alkali treatment of the acetone-condensation products possesses the further disadvantage that it may be applied only with respect to reaction products which contain no more than 10% isophorone and which are free from by-products having a boiling point lower than that of xylitone.

According to a further conventional process, isophorone reaction mixtures may be purified where the same are contaminated with only slight amounts of impurities. Specifically, the acetone-condensation product reaction mixture is treated in liquid phase with fuller's earth and/or acid agents, such as for example, toluene sulfonic acid, in order to convert the slight impurities present to innocuous form. Nevertheless, just as in the case with the former conventional process, this conventional process has not found wide application since the results achieved are not economically significant.

It is an object of the present invention to overcome the foregoing drawbacks and to provide a process for obtaining usable products from the condensation by-product of acetone and specifically to a process for recovering isophorone in high yield from the organic reaction mixture obtained from the oxidation of acetone to isophorone.

Other and further objects of the invention will become apparent from a study of the within specification and accompanying drawings, in which the figure illustrates schematically a distillation column for treating the organic reaction mixture obtained from the condensation of acetone to isophorone, in accordance with the present invention.

It has been found in accordance with the present invention that a process for recovering isophorone in high yields from the organic reaction mixture obtained from the condensation of acetone to isophorone may be provided, which comprises distilling acetone from an intermixture of the organic reaction mixture with a dilute aqueous alkali solution maintained at an elevated temperature while continuously removing the acetone being distilled and continuously separately condensing the removed acetone, and recovering isophorone from the intermixture remaining. Preferably, the intermixture is maintained at and the distilling is carried out at a temperature between about 120 and 300 degrees C. The alkali concentration may be between about 0.001 and 0.1% by weight based upon the total water present in the aqueous alkali solution. Furthermore, the weight ratio of water to organic reaction mixture present ranges from about 0.1 to 10:1.

In accordance with one embodiment of the invention, the organic reaction mixture is distilled at a temperature between about 140 and 160 degrees C. where mesityl oxide is present in addition to isophorone. On the other hand, where the organic reaction mixture contains higher-boiling acetone-condensation products besides isophorone, i.e. acetone-condensation products having a higher boiling point than isophorone, the distilling is carried out at a temperature between about 210 and 240 degrees C. Advantageously, the distilled acetone which is continuously removed is thereafter condensed and the heat of condensation therefrom is recovered and applied as heat in the distillation, while a portion of the distilled and condensed acetone is recycled as direct reflux for the distillation.

Specifically, therefore, the process of the invention selects a combination of chemical and physical principles to circumvent reaction conditions leading to the disadvantages manifested with previous processes for the work up of acetone-condensation products. Particularly effective results are achieved by the method of the invention leading to an enriched isophorone product on the one hand, and reusable by-products on the other hand, as a result of the cleavage and reversing of these by-products to acetone and lower condensates, i.e. condensates having a lower boiling point than isophorone. In fact, the present invention permits not only the conversion of the major portion of the by-products of the acetone condensation back into usable form, but also permits reliably the removal of the comparatively small quantities of impurities, such as xylitone, etc., which although insignificant in amount are very disturbing in the further work up of the isophorone. A significant feature of the present invention is the fact that while the acetone-condensation products, i.e. isophorone-containing mixtures, are treated with dilute aqueous alkali solutions at temperatures within the range of from about 120–300 degrees C., the inter-mixture is subjected to fractional distillation in order to achieve a removal of the lower boiling constituents, i.e. having a lower boiling point than isophorone, present in the mixture and/or formed in the course of the alkali treatment, consisting for the most part of acetone, so as to maintain a shift in equilibrium conditions toward acetone formation from the by-products.

The apparatus utilized for the process of the invention includes a distillation column in which pressure reactions may be carried out, and in which continuous fractional distillation may be attained for separation of the reaction mixture into lighter and more difficultly volatile constituents.

The lighter or more readily volatile constituents, in this connection, contemplate the constituents which are formed by the chemical conversions which take place under the reaction conditions in the distilling column or which are present in the mixture initially. The low boiling or lighter constituents essentially include acetone and those constituents having a lower boiling temperature than isophorone whereas the higher boiling constituents, i.e. overcondensates or higher acetone-condensates, include those constituents having a higher boiling temperature than isophorone.

It will be appreciated that in accordance with the invention a pure fractional distillation alone is not contemplated, but rather a superimposed chemical reaction as well, by which the various by-products are converted to acetone, isophorone, or lower condensates through the particular measures employed, in order to recover a usable portion of the by-products as starting material for the acetone condensation, and in order to enrich the quantity and quality of the isophorone product recovered. Naturally, the particular physical conditions, including temperature and pressure, will be adjusted in dependence upon the make up of the acetone-condensation reaction product charged as the artisan will appreciate. In any case, during the distillation, the lighter boiling constituents, particularly acetone, are continually removed and thus any back-condensation to undesired by-products is no longer possible. Conveniently, a constant and continuous disturbance of the equilibrium occurs in favor of reusable raw materials on the one hand, and an enrichment of isophorone on the other.

The superimposing of the chemical stage upon the distilling stage is effectively carried out in accordance with the invention by contacting the acetone-condensation products with the aqueous alkali solution, either by adding dissolved alkali hydroxide (NaOH, KOH, etc.) as catalyst into the sump of the distillation column, or even more desirably, into the upper portion of the column. In the latter instance, advantageously, a counter-flow is achieved between the downwardly passing catalyst solution and the rising materials being distilled. An intimate contact is thereby obtained between the alkali solution and the reaction mixture which ensures the utmost efficiency of the process. The individual reactions which take place depending upon the individual by-products present proceed readily upon contact with the aqueous alkali solution, either in the sump of the distillation column or by countercurrent contact therewith.

In this regard, it is recognized that conversions of the foregoing types of by-products will take place only at sufficiently high pH ranges, i.e. alkaline pH, whereas in neutral or acid medium practically no reaction of the desired kind will proceed.

Depending upon the composition and reactivity of the raw reaction product of condensates to be treated, several observations may be made. On the one hand, by-products possessing larger molecules may be decomposed by alkali catalyzed hydrolysis, while, on the other hand, specific substances may be subjected to molecular rearrangement or reversion into compounds which cease to burden the distillation. Specifically, the molecular rearrangement may lead to the formation of further isophorone from specific substances which would otherwise unduly disturb the further work up and the qualities of the isophorone product. It should be noted that while isophorone is present under the reaction conditions of the distillation, on account of its particular stability, isophorone is not subject to cleavage, decomposition, or molecular rearrangement, even to a minor degree. This result is extremely surprising in view of the reaction conditions, and may be explained or at least be traced to the immediate removal of the acetone which forms or which is present in the reaction mixture.

A great advantage of the process is found in the low concentration as well as the low consumption of the alkali hydroxide catalyst. In contrast to the normal quantity required for the conventional conversion of my-products in the acetone-condensation products, alkali concentrations of less than 0.1% by weight based upon the water present may be employed. Excellent results are even obtained with an alkali content of 0.03% by weight which corresponds to a pH value of about 12. Of course, at least about 0.001% by weight of alkali should be present. In general the pH range may lie in the range of about 10–13.

The amount of water which is used significantly will depend upon the type and composition of the acetone-condensation products being treated. The quantity may be determined easily in the particular case as the artisan will appreciate. In general, it has been found that regardless of which products are treated, the ratio of the quantity of water to the quantity of organic substances present will range between 10:1 to 0.1:1 parts by weight, i.e. 0.1–10:1.

While the production of mesityl oxide is of only slight utility as an end product in the condensation of acetone to form isophorone, mesityl oxide appears in the reaction mixture in an amount of about 10–25% based upon the isophorone present. Therefore, these relatively large amounts of mesityl oxide, which would otherwise have very little utility, may be recovered for recycling to the acetone condensation after conversion into acetone. This may be accomplished by simple hydrolysis of the condensation reaction mixture in aqueous alkaline medium coupled with the continuous drawing off of the newly formed acetone. Such acetone is in fact recovered by subjecting the hydrolysis contents to fractional distillation in the lower part of the temperature range indicated above. Specifically, a very suitable result is achieved at a temperature of at least about 140 degrees C., and preferably within the range of 140–160 degrees C., practically all of the mesityl oxide present being converted into acetone under the hydrolysis conditions. Notably, this would not be the case if the acetone being formed were permitted to remain in the reaction mixture. The reason for this would be that, among other things, such acetone would revert to condensates and even isophorone, depending upon the equilibrium conditions. Among the condensates formed would be xylitones and over-condensates i.e. having a higher boiling point than isophorone, in significant quantities. By not drawing off the newly formed acetone, the obtaining of an isophorone fraction of the desired purity would be beset with the same difficulties as are encountered during the work up of the normal condensation product. The present invention, therefore, provides a pure hydrolysis under the fractional distillation procedure applied, such hydrolysis being continually favored by reason of the continuous distillation recovery of acetone.

With respect to the over-condensates which are present in the reaction mixture besides mesityl oxide, these over-condensates include materials which are formed during the condensation of acetone to isophorone, some of which possess boiling temperatures substantially higher than isophorone. These overcondensates are considerably more resistant to cleavage than is mesityl oxide, although gradations in cleavage of these overcondensates may be observed, i.e. the lower boiling constituents generally decompose at first, and the higher boiling constituents thereafter, etc. In order to reduce the large amounts of overcondensates present in the reaction mixture, similar conditions are employed to those employed in the hydrolysis of mesityl oxide, with the exception that higher temperatures are preferred, between about 210 and 240 degrees C. Nevertheless, temperatures up to about 300 degrees C. may also be used to advantage. In any case, the temperature will be adjusted in dependence upon the particular distilling column pressure employed. Depending upon the particular conditions, including the continuous removal of the acetone formed by cleavage of the over-condensates, the decomposition or cleavage of these materials is effectively carried out with the formation of acetone and isophorone in an amount up to about 80% of the condensates present. At the same time, under the reaction conditions employed, a molecular rearrangement or isomerization takes place whereby the disturbing compounds, such as phorone, beta-isophorone, etc., are changed to isophorone.

It will be apreciated that in accordance with the present invention not only may the individual components present in the acetone condensation reaction mixtures be converted but also the entirety of these condensation products in the reaction mixture. Suitably, the acetone unconverted in the condensation to isophorone is preliminarily removed and then thereafter the particular conditions indicated above are applied for the treatment of the over-condensates in the reaction mixture. Accordingly, the mesityl oxide is completely converted to acetone and the over-condensates are converted as noted above into acetone, on the one hand, and isophorone on the other. Furthermore, it is surprising that the very troublesome impurities in the reaction mixture disappear during the hydrolysis and distillation steps without the isophorone itself being attacked during the treatment. After the simple processing of the remaining condensates in the isophorone-enriched fraction, i.e. containing isophorone and higher boiling further non-decomposable over-condensates, an isophorone product is obtained having a quality which excels by far that of the isophorone products heretofore obtained in the conventional manner.

As may be appreciated, it is not readily possible in practice to obtain an absolutely pure isophorone in the normal manner by means of the hydrolysis and fractional distillation steps in accordance with the invention. However, the technical isophorone-enriched product may be subjected to final processing measures including further distillation stages, even under reduced pressure, so that an isophorone product may be obtained no longer having any impurities, and which is crystal clear and free from the tendency to discoloration. The isophorone-enriched product obtained in accordance with the present invention is particularly excellent as a solvent and furthermore may be applied as a raw material in reactions where the aforementioned impurities would otherwise cause great disturbances, i.e. in oxidation reactions after the isophorone has been hydrogenated.

The present invention is further illustrated by the following examples, and it is to be understood that the invention is not to be limited thereby.

Example 1

In a distillation column 1, capable of withstanding about 50 atmospheres excess pressure and filled with Raschig rings of 8 mm. diameter and having a column diameter of 100 mm. and a length of 8 mm., 5 kilograms of over-condensates are pumped in per hour through line 2. These over-condensates represent the by-product reaction mixture resulting from the condensation of acetone to form technical isophorone (4% by vol.), and include besides xylitones (44% by vol.), phorone (3% by vol.), beta-isophorone (4% by vol.), diisophorone (14% by vol.), mainly higher acetone-condensates (31% by vol.). Simultaneously with the introduction of the over-condensates, 5 kilograms per hour of aqueous catalyst solution containing 0.05 percent by weight of NaOH are also pumped into column 1 through line 2. By heating the sump 3 of column 1 and regulating the column pressure at about 30 atmospheres excess pressure, a temperature gradient is formed within the column in a stationary manner, such that the sump 3 has a temperature of about 235 degrees C,. while the head of the column has a temperature of about 205 degrees C. These conditions correspond to the vapor pressure of the acetone formed during the cleavage. By intimate contact of the organic phase of over-condensates and aqueous phase of alkaline catalyst under the distillation and the reflux of acetone (reflux ratio $R=1:1$) entering through line 7, suitable hydrolysis and a rearrangement of the over-condensates occur within column 1. Acetone which forms in the column is recovered from the head and according to the amount formed, a portion which condenses in condenser 5 is recycled through line 7 back to the upper portion of the column. The remainder of the condensed acetone from condenser 5 may be recovered through line 6 (about 1.5 kilograms per hour). In this manner, the desired fractional distillation will take place, under acetone reflux, in countercurrent to the aqueous and organic phases entering the column through line 2. The suitable hydrolysis and rearrangement will thus occur so that the sump will contain a lower aqueous phase and an upper organic phase. While the acetone formed in the reaction may be recovered from the head of the column through line 4, the organic phase containing an isophorone-enriched product may be drawn off from the sump (about 4 kilograms per hour), and if desired passed to a further vacuum distillation stage whereby 42% isophorone based upon the reaction mixture charged to the distillation column may be obtained in colorless form. On the other hand, 26% of the acetone is recovered through line 6 (based upon the original charge). The remaining 32% of the original reaction mixture charged through line 2 to the column consists of over-condensates no longer convertible under the reaction conditions but readily separable from isophorone by subsequent vacuum distillation. The beta-isophorone, the phorone, the xylitones and the main part of the diisophorone disappears. The non-hydrolyzable over-condensates (44% based upon the over-condensates charged) remain.

The water present in the aqueous phase in the sump may be suitably recycled through line 8 (about 110 kilograms per hour) for mixing with incoming organic reaction mixture passing through line 2 into column 1. The water passing from sump 3 through line 8 into line 2, however, is first enriched with an amount of alkali sufficient to restore the alkali losses occurring through neutralization (e.g. by very low quantities of organic acids such as acetic acid formed during the reaction conditions and low quantities of carbon dioxide contained in the water) etc. under the hydrolysis and distillation conditions in column 1. A significant economy in both water and alkali is achieved by this recycling step. Furthermore, by supplying cooling water to condenser 5, the heat of condensation of the acetone passing therethrough will generate steam from such water, which steam may be applied for heating sump 3. Hence, a conservation in energy is attained so that only insignificant quantities of supplemental energy are required for maintaining the desired temperature and pressure conditions.

Example 2

The procedure of Example 1 is repeated, in this case for the purpose of converting mesityl oxide to acetone. 20 liters of mesityl oxide and 20 liters of aqueous catalyst of the same composition used in Example 1 are fed per hour through line 2 to column 1. The mesityl oxide is totally converted to acetone without organic products resulting in the sump, a head temperature of only 130 degrees C. being maintained which corresponds to a column pressure of 7.5 atmospheres excess pressure. This conversion represents a particularly simple execution of the hydrolysis of mesityl oxide and recovery of acetone.

Example 3

The procedure of Example 1 is repeated using the same charge and reaction conditions for converting the over-condensates whereby it was possible to obtain a sump product which was absolutely free from mesityl oxide and contained only about 50% of the over-condensates originally charged through line 2. Of these over-condensates, the xylitones were particularly actively decomposed. The charge was composed of the reaction mixture obtained from the condensation of acetone to isophorone after the removal of acetone unreacted in the condensation therefrom. The charge had a composition including 60% isophorone, 20% over-condensates, and 20% mesityl oxide in percents by volume.

Example 4

The procedure of Example 1 is repeated using twice the charge passed into the column through line 2 of Example 1. The product obtained was actively freed from impurities, containing only about 1–2% xylitones, etc., and is readily applicable as a solvent. By subjecting the yellowish colored product to vacuum distillation in an after-connected stage, a water-clear, as well as light and air resistant product of highest quality is obtained representing practically pure isophorone. If 10 kilograms of the technical isophorone are charged 9.6 kilograms of pure isophorone are obtained besides about 250 grams acetone (over head) and 200 grams of a non distillable residue.

What is claimed is:

1. Process for recovering isophorone in high yields from the organic reaction mixture obtained from the condensation of acetone to isophorone wherein said organic reaction mixture includes in addition to isophorone substantially both products having a lower boiling point than isophorone and products having a higher boiling point than isophorone, which comprises passing such organic reaction mixture to a distillation zone having a head, distilling acetone in such distillation zone from an intermixture of such organic reaction mixture with a dilute aqueous alkali solution in a weight ratio of water to organic reaction mixture of from about 0.1 to 10:1 maintained at an elevated temperature, said aqueous alkali solution having an alkali concentration between about 0.001 and 0.1% by weight based on the water present in the aqueous alkali solution, continuously removing from the head of said zone the acetone being distilled, and continuously separately condensing the removed acetone, and recovering isophorone from the intermixture remaining.

2. Process according to claim 1 wherein the intermixture is maintained and the distilling is carried out between about 120 and 300 degrees C.

3. Process according to claim 2 wherein the organic reaction mixture contains specifically mesityl oxide which has a lower boiling point than isophorone and the distilling is carried out between about 140 and 160 degrees C. to convert particularly said mesityl oxide to acetone.

4. Process according to claim 2 wherein the organic reaction mixture contains specifically acetone-condensation products which have a higher boiling point than isophorone and the distilling is carried out between about 210 and 240 degrees C. to convert particularly said acetone-condensation products to isophorone and acetone.

5. Process according to claim 2 wherein the distilled acetone continuously removed and thereafter condensed and is condensed such that the latent heat of condensation therefrom is recovered by indirect heat exchange with a heat exchange medium and applied in the distillation by further indirect heat exchange of said medium with the remaining liquids in the intermixture, a portion of the distilled condensed acetone being recycled as reflux for the distillation.

6. Process for recovering isophorone in high yields from the organic reaction mixture of condensation products obtained from the condensation of acetone to isophorone wherein said organic reaction mixture includes in addition to isophorone substantially both products having a lower boiling point that isophorone and products having a higher boiling point than isophorone, which comprises passing such organic reaction mixture to a distillation zone, hydrolytically treating in such distillation zone at an elevated temperature such organic reaction mixture of acetone-condensation products with a dilute aqueous alkali solution in a weight ratio of water to organic reaction mixture of from about 0.1 to 10:1 said aqueous alkali solution having an alkali concentration between about 0.001 and 0.1% by weight based on the water present in the aqueous alkali solution, distilling such lower-boiling products including acetone from a sump intermixture of the hydrolytically treated organic reaction mixture and dilute aqueous alkali solution in such distillation zone at a temperature between about 120 and 300 degrees C., continuously removing said lower-boiling products including acetone from the head of the distillation zone as they are distilled and continuously separately condensing the removed lower-boiling products including acetone, and recovering isophorone from the sump of the distillation zone.

7. Process according to claim 6 wherein the acetone-condensation products include specifically mesityl oxide which has a lower boiling point than isophorone, the hydrolytic treating and distilling being carried out between about 130 and 160 degrees C. and at a pressure of about 7.5 atmospheres gage, said mesityl oxide being substantially converted at said temperature to acetone and said acetone being continuously removed from the head of the distillation zone.

8. Process according to claim 6 wherein a pressure of about 30 atmospheres gage is maintained in the zone, and a temperature of about 235 degrees C. is maintained in the sump while a temperaturre of about 205 degrees C. is maintained in the head of the zone.

9. In the process of recovering isophorone in high yields from the organic reaction mixture of acetone and acetone-condensation products obtained from the condensation of acetone to isophorone wherein said organic reaction mixture includes in addition to isophorone substantially both products having a lower boiling point than isophorone and products having a higher boiling point than isophorone, the improvement which comprises passing such organic reaction mixture to a distillation zone, contacting such organic reaction mixture of acetone-condensation products including isophorone with a dilute aqueous alkali solution in a weight ratio of water to organic reaction mixture of from about 0.1 to 10:1 in such distillation zone at a temperature between about 120 and 300 degrees C., said aqueous alkali solution having an alkali concentration between about 0.001 and 0.1% by weight based on the water present in the aqueous alkali solution, distilling from the zone such lower-boiling products including acetone and lower-boiling acetone-condensation products, said lower boiling acetone-condensation products being formed as a result of said contacting at said temperature by reversion of higher-boiling acetone-condensation products having a higher boiling point than isophorone which are present in the organic reaction mixture, continuously removing the distilled lower-boiling products including acetone from the head of said distilling zone as they are distilled and continuously separately condensing the removed lower-boiling products including acetone, and recovering an isophorone-rich organic product from the sump of said distillation zone.

10. Improvement according to claim 9 wherein the temperature in the zone is maintained between 140 and 160 degrees C., mesityl oxide initially present as acetone-condensation product in the organic reaction mixture being converted to acetone as a result of said contacting at said temperature, and said acetone being distilled and removed from the head of the zone while isophorone is recovered from the sump.

11. Improvement according to claim 9 wherein the temperature in the zone is maintained between 210 and 240 degrees C., said higher-boiling acetone-condensation products initially present in the organic reaction mixture being converted to isophorone and lower-boiling condensation products including acetone as a result of said contacting at said temperature, and said lower-boiling condensation products including acetone being distilled and removed from the head of the zone while isophorone is recovered from the sump.

12. Improvement according to claim 9 wherein acetone unconverted in the isophorone condensation and present tin the organic reaction mixture initially is removed prior to contacting the organic reaction mixture of acetone-condensation products with the alkali solution.

References Cited
UNITED STATES PATENTS

| | | | |
|---|---|---|---|
| 2,351,352 | 6/1944 | McAllister et al. | 260—586 |
| 2,419,051 | 4/1947 | Ballard et al. | 260—586 |
| 2,566,564 | 9/1951 | Highet et al. | 260—586 |
| 2,912,365 | 11/1959 | Irvine | 202—75 |

NORMAN YUDKOFF, *Primary Examiner.*

GEORGE D. MITCHELL, *Examiner.*

W. L. BASCOMB, F. E. DRUMMOND,
*Assistant Examiners.*

UNITED STATES PATENT OFFICE
CERTIFICATE OF CORRECTION

Patent No. 3,337,423                          August 22, 1967

Karl Schmitt et al.

It is hereby certified that error appears in the above numbered patent requiring correction and that the said Letters Patent should read as corrected below.

Column 4, line 24, for "my" read -- by --; column 6, line 2, for "8 mm." read -- 8 m, --; line 53, for "disappears" read -- disappear --; column 8, line 5, strike out "and".

Signed and sealed this 1st day of October 1968.

(SEAL)
Attest:

Edward M. Fletcher, Jr.                              EDWARD J. BRENNER

Attesting Officer                                           Commissioner of Patents